(12) United States Patent
White et al.

(10) Patent No.: US 8,991,775 B2
(45) Date of Patent: Mar. 31, 2015

(54) KIOSKS FOR ELECTRONIC DEVICES

(71) Applicants: Mel White, Oregon City, OR (US);
Kevin Carty, Portland, OR (US);
Yevgeniy Ponomarenko, Portland, OR (US)

(72) Inventors: Mel White, Oregon City, OR (US);
Kevin Carty, Portland, OR (US);
Yevgeniy Ponomarenko, Portland, OR (US)

(*) Notice: Subject to any disclaimer, the term of this patent is extended or adjusted under 35 U.S.C. 154(b) by 0 days.

(21) Appl. No.: 13/860,320

(22) Filed: Apr. 10, 2013

(65) Prior Publication Data

US 2014/0014790 A1    Jan. 16, 2014

(51) Int. Cl.
| *F16M 11/04* | (2006.01) |
| *F16M 11/08* | (2006.01) |
| *F16M 11/22* | (2006.01) |
| *F16M 13/00* | (2006.01) |

(52) U.S. Cl.
CPC ............ *F16M 11/04* (2013.01); *F16M 11/041* (2013.01); *F16M 11/08* (2013.01); *F16M 11/22* (2013.01); *F16M 13/00* (2013.01); *F16M 2200/065* (2013.01); *F16M 2200/08* (2013.01)
USPC ................... 248/122.1; 248/125.7; 108/50.02

(58) Field of Classification Search
CPC ....... F16M 11/04; F16M 11/08; F16M 11/22; F16M 11/041; F16M 220/08; F16M 220/065; F16M 13/00
USPC ............ 248/122.1, 121, 125.7, 176.1, 178.1, 248/186.1, 186.2, 461, 349.1; 361/679.4; 108/50.02
See application file for complete search history.

(56) References Cited

U.S. PATENT DOCUMENTS

| 4,309,121 | A  | * | 1/1982  | Salame .......................... 403/164 |
| 4,634,090 | A  | * | 1/1987  | Currie et al. .................. 248/544 |
| 5,769,369 | A  | * | 6/1998  | Meinel ........................ 248/176.1 |
| 5,944,896 | A  | * | 8/1999  | Landesman et al. .......... 118/500 |
| 6,443,408 | B1 | * | 9/2002  | Hung .......................... 248/176.1 |
| 7,644,903 | B2 | * | 1/2010  | Amato et al. ............... 248/349.1 |
| 8,611,076 | B2 | * | 12/2013 | Wetzel et al. ............. 361/679.06 |
| 8,677,911 | B2 | * | 3/2014  | McRorie .................... 108/50.02 |
| 2005/0150432 | A1 | * | 7/2005 | Wen ................................ 108/38 |
| 2008/0042020 | A1 | * | 2/2008 | Laitila et al. .................. 248/131 |
| 2010/0065694 | A1 | * | 3/2010 | Duan et al. .................... 248/121 |
| 2010/0108848 | A1 | * | 5/2010 | Chang ........................ 248/349.1 |
| 2013/0048802 | A1 | * | 2/2013 | Guran ......................... 248/122.1 |
| 2013/0078855 | A1 | * | 3/2013 | Hornick et al. ............... 439/571 |
| 2013/0342087 | A1 | * | 12/2013 | Guran ............................ 312/7.2 |

* cited by examiner

*Primary Examiner* — Anita M King
(74) *Attorney, Agent, or Firm* — Mohr Intellectual Property Law Solutions, PC

(57) ABSTRACT

Kiosks for supporting an electronic device, where the kiosks include a stand, a swivel mechanism roratably coupled to the stand, and a frame mounted to the swivel member and configured to support the electronic device. In some examples, the swivel mechanism includes a fixed member coupled to the stand and a swivel member rotatably supported by the fixed member. The swivel member is configured to rotate relative to the fixed member between a first position, which orients the frame in a first orientation, and a second position, which orients the frame in a second orientation. In some examples, swivel mechanism includes a position selection mechanism.

20 Claims, 7 Drawing Sheets

KIOSKS FOR ELECTRONIC DEVICES

BACKGROUND

The present disclosure relates generally to kiosks for electronic devices, in particular, kiosks configured to rotate electronic devices into different orientations are described.

Kiosks are popular with businesses, consumers, presenters, museum patrons, and students as a means for displaying and interacting with information at a convenient location. Kiosks can be placed in businesses, stores, vendor areas in common spaces, presentation halls, museums, classrooms, and many other places.

Traditionally, kiosks displayed fixed media, such as banners, billboards, physical products, and other physical, permanent displays. More recently, kiosks have included electronic devices, such as televisions and computer monitors. With the advent of touchscreen user interface technology in tablet computers and electronic handheld devices, such as iPad® and Android® brand devices, kiosks have evolved to include electronic devices with interactive touchscreen capabilities.

Known kiosks are not entirely satisfactory for the range of applications in which they are employed. For example, existing kiosks do not enable a user to conveniently change the orientation of the display, such as between a portrait orientation and a landscape orientation. In addition, conventional kiosks do not safeguard against rotating an electronic device beyond 360 degrees, which can twist, harm, and/or disconnect cables connected to the electronic device, Further, known kiosks do not provide means for conveniently rotating electronic devices to preselected orientations, such as a 90 degree orientation, a 180 degree orientation, and a 270 degree orientation.

Thus, there exists a need for kiosks that improve upon and advance the design of known kiosks. Examples of new and useful kiosks relevant to the needs existing in the field are discussed below.

SUMMARY

The present disclosure is directed to kiosks for supporting an electronic device, where the kiosks include a stand, a swivel mechanism rotatably coupled to the stand, and a frame mounted to the swivel member and configured to support the electronic device. In some examples, the swivel mechanism includes a fixed member coupled to the stand and a swivel member rotatably supported by the fixed member. The swivel member is configured to rotate relative to the fixed member between a first position, which orients the frame in a first orientation, and a second position, which orients the frame in a second orientation. In some examples, the swivel mechanism includes a position selection mechanism.

DETAILED DESCRIPTION

The disclosed kiosks will become better understood through review of the following detailed description in conjunction with the figures, The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various kiosks are provided. Related features in the examples may be identical, similar, or dissimilar in different examples. For the sake of brevity, related features will not be. redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
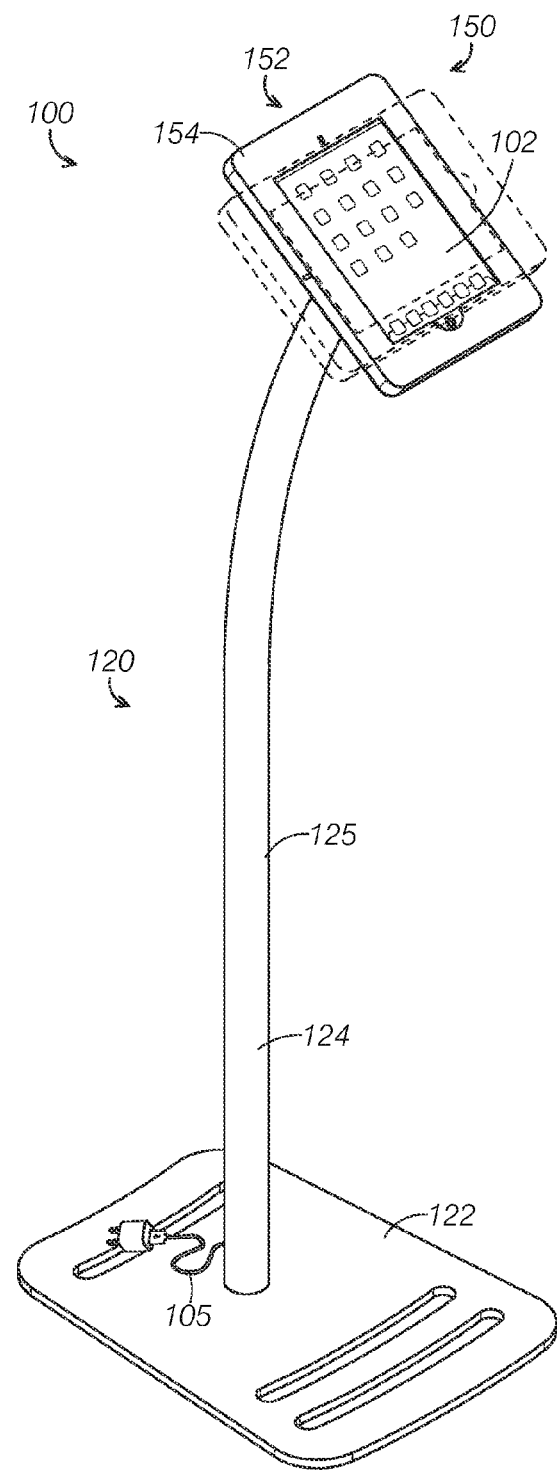
FIG. 1 is a perspective view of a kiosk for supporting an electronic device including a frame in a portrait orientation in solid lines and in a landscape orientation in dashed lines.

With reference to FIGS. 1-7, a first example of a kiosk, kiosk 100, will now be described. As shown in FIG. 1, kiosk 100 includes a stand 120, a swivel mechanism 130, and a frame 150. Kiosk 100 functions to support and display an electronic device 102.

As shown in FIG. 1, kiosk 100 enables a user to conveniently change the orientation of electronic device 102. For example, a user of kiosk 100 may conveniently change the orientation of electronic device 102 between portrait and landscape orientations.

In addition, kiosk 100 restricts a user from rotating electronic device 102 beyond 360 degrees to avoid harming or disconnecting cables connected to electronic device 102 by twisting them excessively. Further, kiosk 100 facilitates conveniently rotating electronic device 102 to preselected orientations, such as a 90 degree orientation, a 180 degree orientation, and a 270 degree orientation.

In the example shown in FIG. 1, electronic device 102 defines a tablet computer having an electronic display. However, the electronic device may be any currently known or later developed type of electronic device. Suitable electronic devices include tablet computers, such as iPad® and Android® brand tablet computers, laptop computers, computer monitors, televisions, cell phones, portable data assistants, hybrid devices, and the like, As shown in FIG. 1, stand 120 includes a base 122 and a stem 124 extending from base 122. In the example depicted in FIGS. 1 and 2, base 122 and stem 124 are detachably connected to one another to permit a user to disassemble the stand as desired, such as when transporting kiosk 100. However, in other examples, the base and the stem are integrally connected as a unitary member. The stand may be any currently known or later developed style of stand suitable for supporting a frame and electronic device.

In some examples, the kiosk includes multiple stems extending from a single base. In other examples, the kiosk includes multiple stems and multiple bases supporting each stem. For example, one stem may support a first frame housing a first electronic device in a first orientation and a second stem may support a second frame housing second electronic device in a second orientation. The different orientations may be offset by different degrees; depending on the application, such as offset by 180 degrees, 90 degrees, 45 degrees, or anywhere in between.

In the present example, stand 120 is made of metal; in particular, powder-coated aluminum. However, in other examples the stand is made of plastic wood, composite materials, or combinations of materials. A wide range of materials may be used to form the stand provided the material has sufficient structural rigidity to support the electronic device and the other components of the kiosk supported by the stand.

Figure 2:
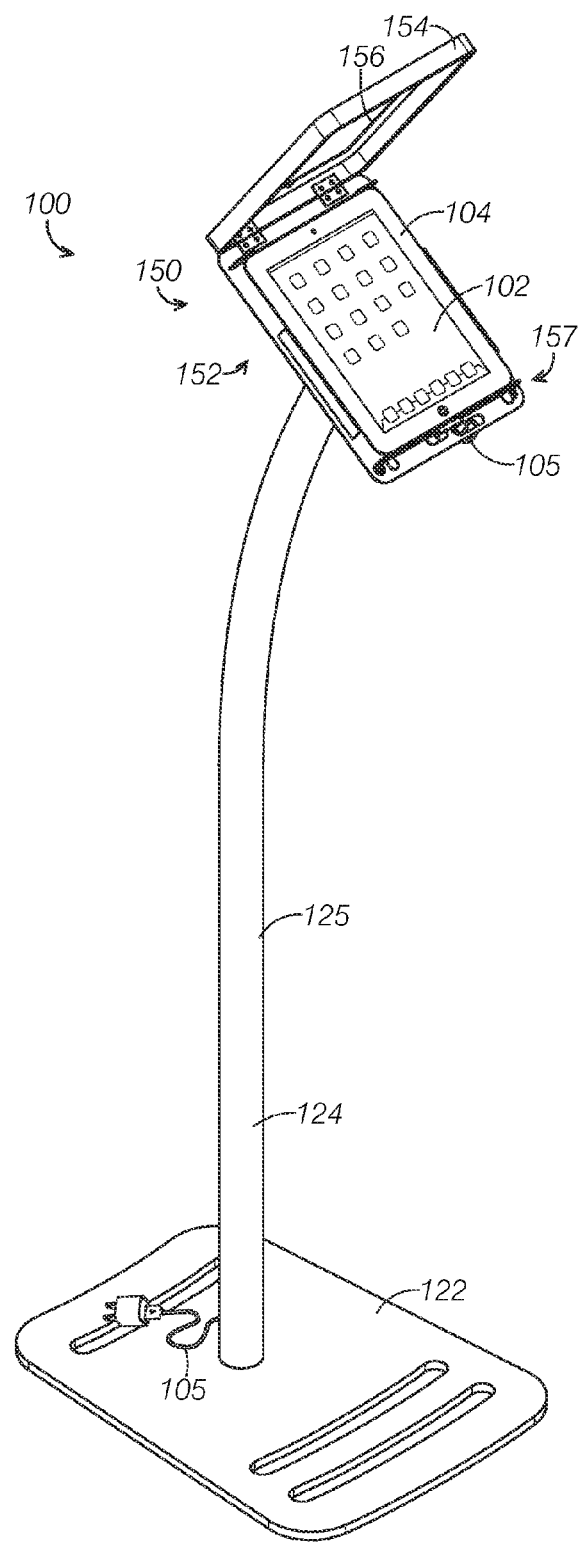
FIG. 2 is a perspective view of the kiosk shown in FIG. I with the frame in an open configuration.

In the example shown in FIGS. 1 and 2, stem 124 is elongate and curved to orient frame 150 in a position where electronic device 102 is conveniently viewable and accessible to a user standing adjacent to kiosk 100. In other examples, the stem is substantially straight, straight with angular bends, or irregularly shaped.

In some examples, as shown in FIGS. 1 and 2, stem 124 is a hollow tube 125 to enable data cables and/or power cables 105 to be routed inside stem 124 to electrically couple with electronic device 102 supported in frame 150. In other examples, the stem is solid or partially solid and not configured to receive power and data cords.

Base 122 is substantially planar and relatively wide to provide stable footing for stand 120. The base may be a wide variety of shapes, including substantially rectangular, square, circular, oval, triangular, or irregular. In some examples, the base is less planar and instead has a significant height, such as adopting the shape of a cube or box.

Swivel mechanism 130 is coupled to a mounting plate 126 of stand 120 via threaded fasteners 135. In some examples, at least a portion of the swivel mechanism is integral to the stand. For example, the fixed member described below may be an integral component of the stand. In some examples, the mounting plate and the fixed member are the same component.

Figure 3:
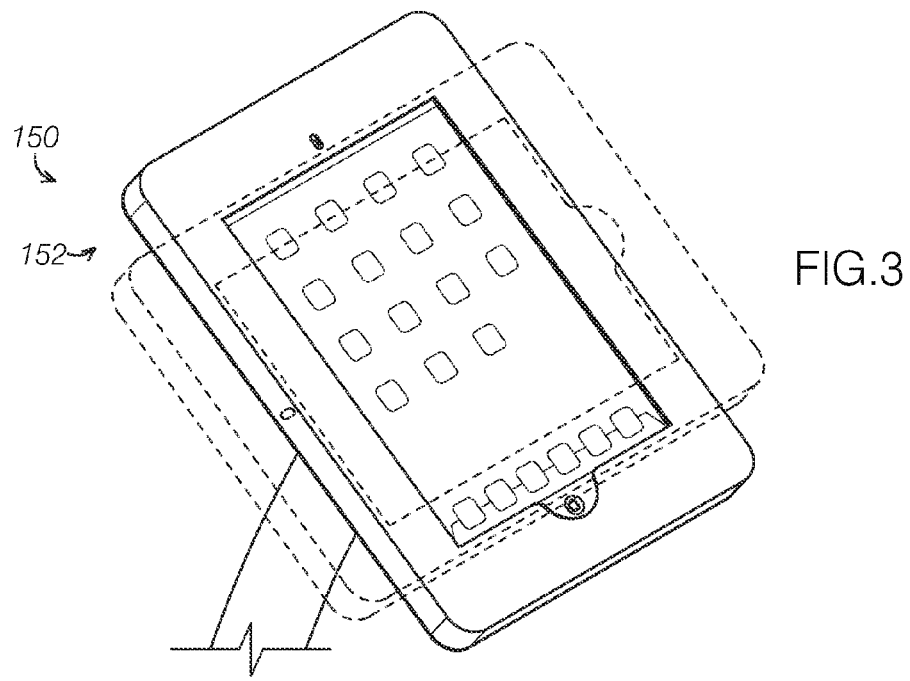
FIG. 3 is a close-up perspective view of the frame shown in FIG. 1 in a portrait orientation in solid lines and in a landscape orientation in dashed lines.

Swivel mechanism facilitates rotating or swiveling electronic device 102 supported in frame 150 relative to stem 124. As shown in FIGS. 1 and 3, swivel member 134 is configured to rotate frame 150 between a first orientation, shown in solid lines, and a second orientation, shown in dashed lines.

By enabling frame 150 to rotate between different orientations, swivel mechanism 130 enables a user to conveniently change the orientation of electronic device 102 supported in frame 150. As shown in FIGS. 1 and 3, electronic device 102 is supported by frame 150 in a portrait orientation when frame 150 is in the first orientation and electronic device 102 is supported by frame 150 in a landscape orientation when frame 150 is in the second orientation.

FIGS. 1 and 3 depict swivel mechanism 130 rotating frame 150 to two different orientations: the first orientation and the second orientation, which is 90 degrees offset from the second orientation. Swivel mechanism 130 is configured to rotate frame 150 to a third orientation 180 degrees offset from the first orientation as well. In some examples, the swivel mechanism is configured to rotate the frame to orientations offset from the first orientation by 270 degrees, 359 degrees, 360 degrees, and more than 360 degrees.

In examples where the swivel mechanism rotates the frame beyond 360 degrees, the kiosk well include appropriate cable management features to avoid issues resulting from cables twisting excessively. Additionally or alternatively, the electronic device may operate without a data or power cable when the swivel mechanism rotates the frame beyond 360 degrees, for example, the electronic device may operate on battery power or incorporate wireless power means.

In some examples, like with swivel mechanism 130, the swivel mechanism includes features to limit it from rotating more than 360 degrees to avoid issues with twisted cables. The rotation limiting features of swivel mechanism 130 are explained in more detail below.

While discreet orientations offset from one another by 90 degrees may be useful in a variety of applications, the swivel mechanisms described herein, including swivel mechanism 130, are configured to rotate the frame to orientations with substantially continuous offsets. For example, the swivel. mechanism may rotate the frame to orientations offset by 5 degrees, 1 degree, or less than 1 degree.

To explain how swivel mechanism 130 functions in more detail, its components will now be described in detail. Swivel mechanism 130 includes a fixed member 132 coupled to stem 124 and a swivel member 134 rotatably supported by fixed member 132. In the example shown in FIGS. 5-9, swivel mechanism 130 also includes a position selection mechanism 140. As can be seen in FIG. 8, swivel mechanism includes a collection of threaded fasteners 139 complimentarily configured with corresponding threaded recesses defined in frame 150 to secure swivel mechanism to frame 150.

The swivel mechanisms described herein may include a variety of additional or alternative features. For example, the swivel mechanism may include a motor or other actuator to rotate the frame without motive force from the user. In some examples, the swivel mechanism includes a bias mechanism to return the frame to a desired orientation, Additionally or alternatively, the swivel mechanism may include a lock mechanism to restrict the frame from rotating from a desired orientation.

Figure 5:
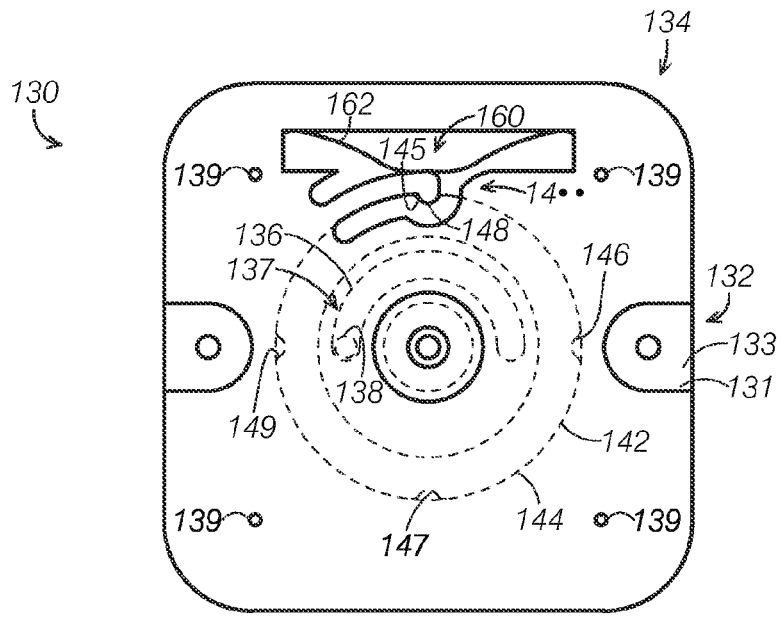
FIG. 5 is a top plan view of a swivel mechanism of the kiosk shown in FIG. 1 with a protrusion of a swivel member extending into an indentation of a fixed member.
Figure 6:
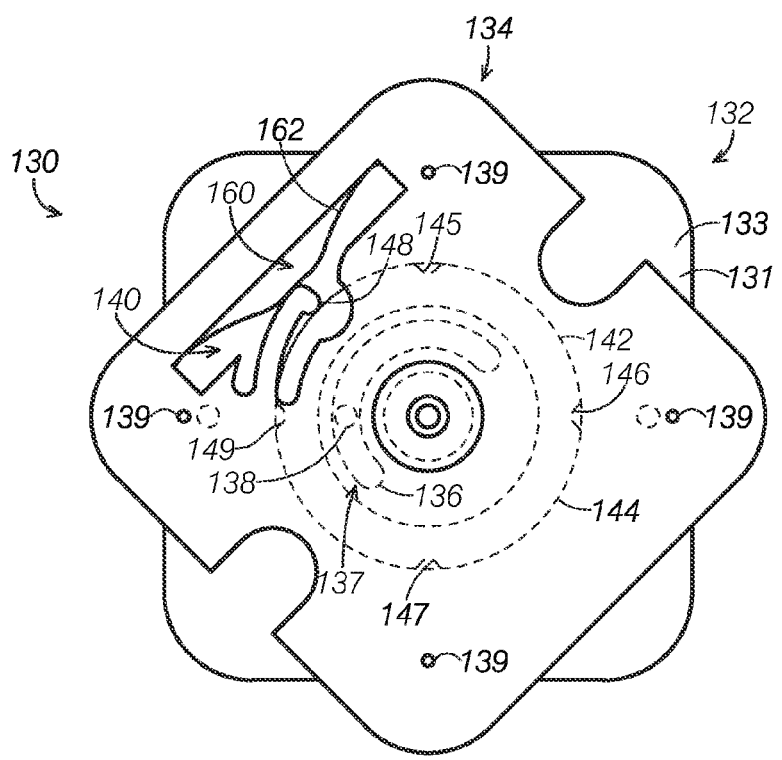
FIG. 6 is a top plan view of the swivel mechanism shown in FIG. 5 with the protrusion not extending into the indentation of the fixed member.

As can be seen in FIGS. 5 and 6, swivel member 134 is rotatably supported by fixed member 132. Swivel member 134 is configured to move relative to fixed member 132 between a first position and a second position radially offset from the first position. In particular, swivel member 134 is configured to rotate relative to fixed member 132 between a first position, which orients frame 150 in a first orientation, and a second position, which orients frame 150 in a second orientation.

Figure 7:
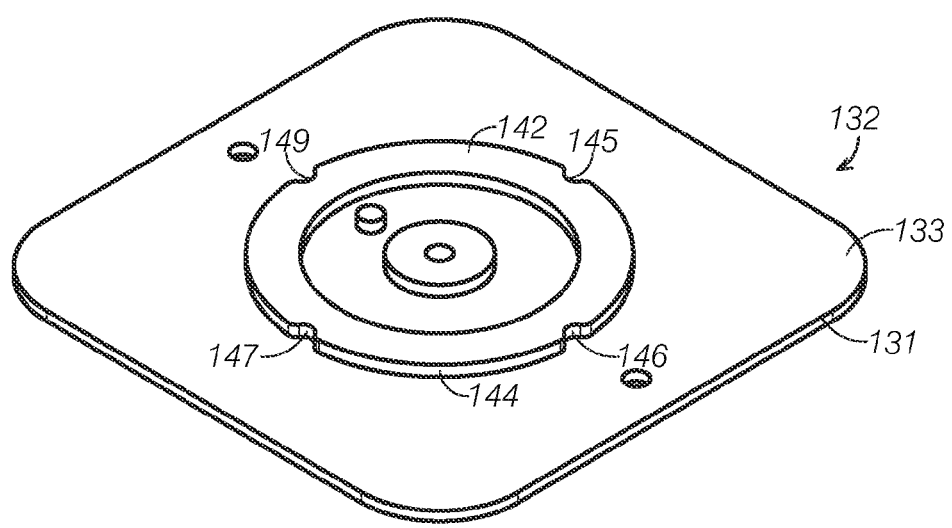
FIG. 7 is a perspective view of a fixed member of the swivel mechanism shown in FIG. 5.
Figure 8:
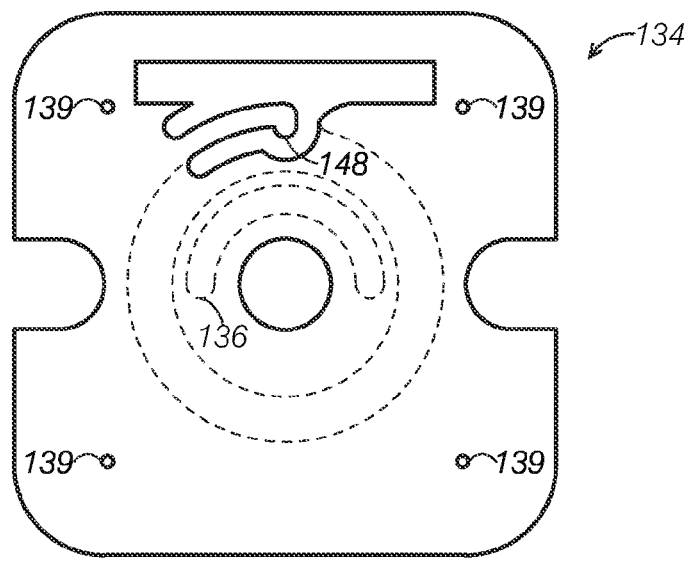
FIG. 8 is a top plan view of a swivel member of the swivel mechanism shown in FIG. 5.
Figure 9:
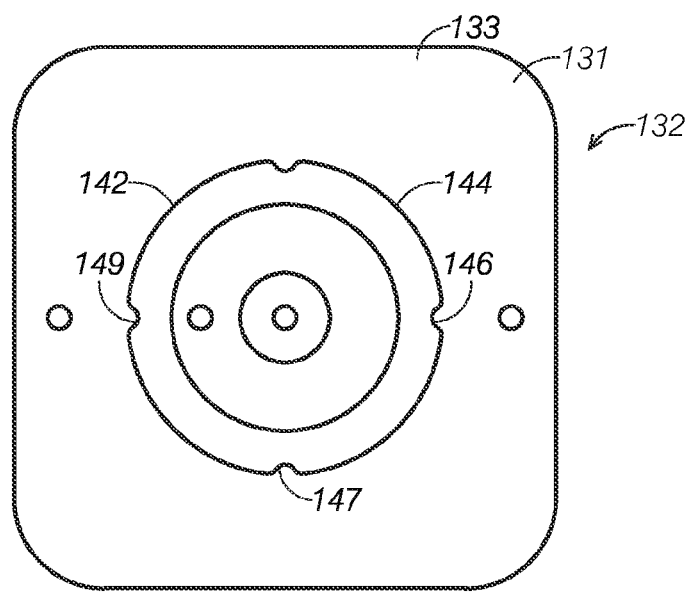
FIG. 9 is a top plan view of the fixed member of the swivel mechanism shown in FIG. 5.

As shown in FIG. 7 and 9, fixed member 132 defines a substantially planar plate 131. In other examples, the fixed member is less planar and instead has a more significant thickness dimension. As can be seen in FIGS. 7 and 9, planar plate 131 includes a face 133. In the present example, substantially planar plate 131 is formed of aluminum, but a wide variety of materials would be suitable, including other metals, polymers, wood, and composite materials.

Serving as a rotation limiting feature cooperating with fixed member 132, swivel member 134 defines a channel 136 extending in a circular arc less than 360 degrees. Fixed member 132 includes a knob 138 complimentarily configured with a channel 136 formed in swivel member 134 to insert into channel 136. Channel 136 and knob 138 define a rotation limiting mechanism 137 and cooperate to restrict swivel member 134 from rotating 360 degrees or more relative to fixed member 132.

More specifically, channel 136 and knob 138 cooperate to restrict swivel member 134 from rotating more than 180 degrees relative to fixed member 132. The circular arc defined by the channel 136 determines the range by which swivel member 134 will rotate relative to fixed member 132. In the example shown in FIGS. 5, 6 and 8, channel 136 extends in a circular arc subtending an angle of 180 degrees and, thus, swivel member 134 may rotate up to 180 degrees relative to fixed member 132. In other examples, the channel defines a circular arc subtending angles of 360 degrees, 359 degrees, 270 degrees, 90 degrees, 45 degrees, and angles in between.

Position selection mechanism 140 is configured to selectively position swivel member 134 at defined positions relative to fixed member 132. In some examples, the position selection mechanism is configured to position the swivel member in a substantially continuous range of positions as opposed to discrete, defined positions. As shown in FIGS. 5-9 position selection mechanism 140 includes a ring 142, a protrusion 148, and a bias mechanism 160.

Referring to FIGS. 7 and 9, the reader can see that ring 142 is mounted to fixed member 132. In the present example, 142 and fixed member 132 are integrally connected. In particular, ring 142 is formed by milling away material from fixed member 132 to define face 133 and ring 142 extending from face 133. In some examples, the ring is secured to the face of the fixed member with adhesives, fasteners, or welds.

As can be seen in FIGS. 5-9, swivel member 134 is complimentarily configured with fixed member 132. Swivel member 134 is configured to slidingly abut face 133 of substantially planar plate 131 of fixed member 132 and to slidingly abut ring 142 ending from face 133. The complimentary configuration of swivel member 134 and fixed member 132 enable swivel member 134 to rotate relative to fixed member while accommodating a rotation limiting mechanism and a position selection mechanism.

In the example shown in FIGS. 5-9, ring 142 includes a circumferential surface 144 defining a plurality of indentations. In particular, circumferential surface 144 defines a first indentation 145, a second indentation 146, a third indentation 147, and a fourth indentation 149. In other examples, the circumferential surface defines 1, 2, 3, 5, 6, 8 or 10 or more indentations.

As can be seen in FIGS. 7 and 9, the indentations defined in ring 142 are offset lay 90 degrees. However, in other examples the indentations are offset lay other angles, such as 10, 15, 30 45, 60, 120, 180, or 270 degrees. In some examples, the offset angles differ between different indentations, such as a 45 degree offset between first indentation and a second indentation and a 90 degree offset between the second indentation and a third indentation.

Protrusion 148 is mounted to swivel member 134 in a position proximate circumferential surface 144 of ring 142 when swivel member 134 is rotatably coupled to fixed member 132. Protrusion 148 is configured to extend into first indentation 145 (or into second indentation 146, third indentation 147 or fourth indentation 149) to restrict swivel member 134 from rotating relative to fixed member 132. In particular, protrusion 148 inserts into first indentation 145 and restricts rotation when swivel member 134 is in a position relative to fixed member 132 here protrusion 148 is aligned with first indentation 145.

By restricting swivel member 134 from rotating when protrusion 148 inserts into one of the indentations, position selection mechanism 140 serves to define specific "rest positions" for swivel mechanism 130. in the particular example shown in the figures, position selection mechanism 140 defines four rest positions offset by 90 degrees. However, rotation limiting mechanism 137 restricts swivel member 134 from rotating to a position where protrusion 148 aligns with third indentation 147; thus, swivel mechanism 130 uses only three of the four defined rest positions.

Position selection mechanisms may define different numbers of rest positions. For example, the position selection mechanism may define 1, 2, 3, 4, 5, 8, or 10 or more rest positions.

Bias mechanism 160 is configured to bias protrusion 148 toward circumferential surface 144. In particular, bias mechanism 160 is configured to bias protrusion 148 into one of the indentations defined in circumferential surface 144 when swivel member 134 is in a rest position relative to fixed member 132 where protrusion 148 is aligned with one of the indentations. As shown in FIGS. 5 and 6, bias mechanism 160 includes a leaf spring 162; however, any currently known or later developed form of bias mechanism may be used.

Figure 10:
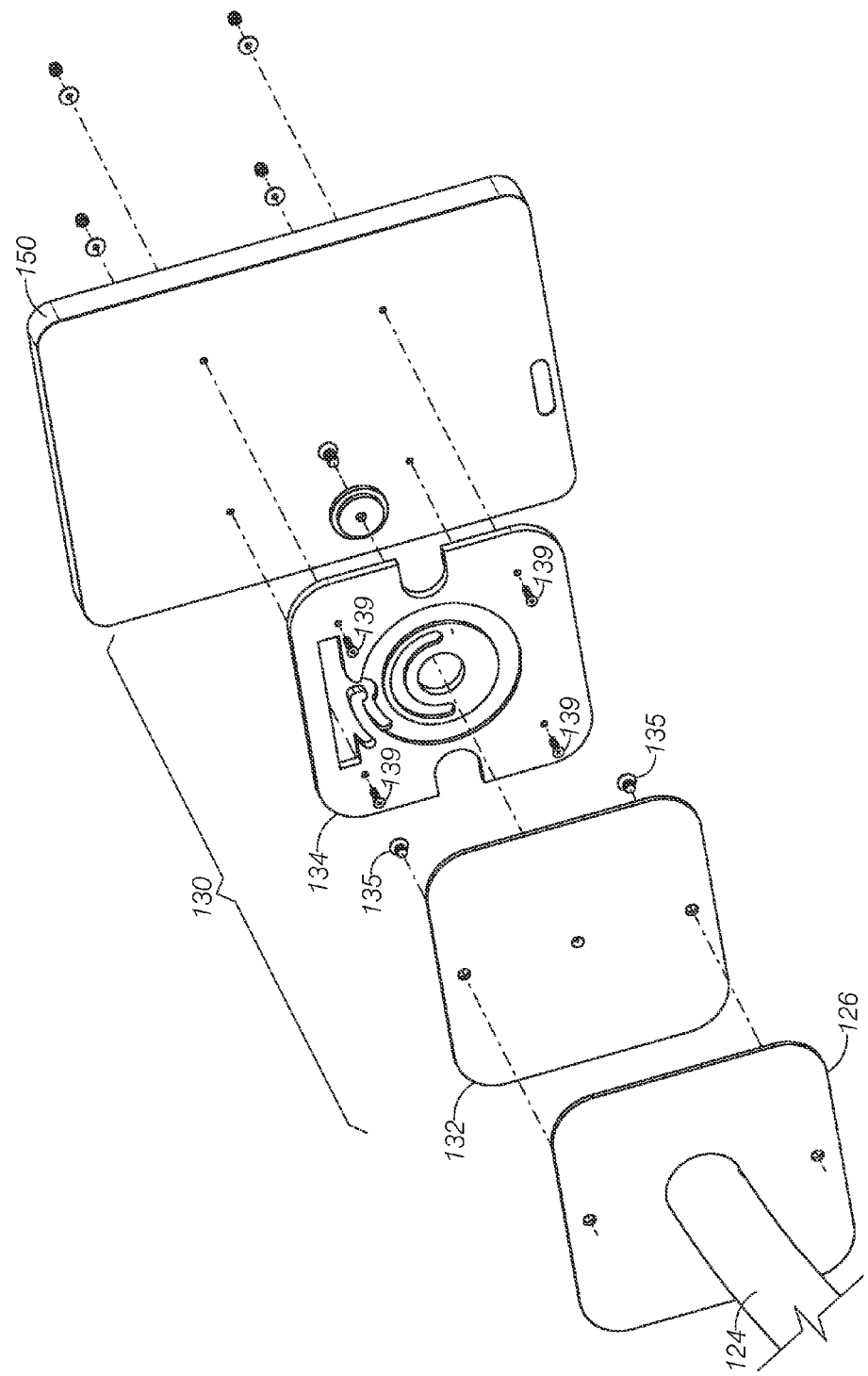
FIG. 10 is a rear perspective view of the swivel mechanism shown in FIG. 5 depicting the swivel mechanism coupled to a stand of the kiosk and the frame coupled to the swivel mechanism.

As shown in FIG. 10, frame 150 is mounted to swivel member 134 via threaded fasteners 139. Frame 150 is configured to support electronic device 102 in a range of different orientations. As shown in FIGS. 1-4, frame 150 defines a clamshell housing 152 configured to selectively open to receive electronic device 102 inside clamshell housing 152. In other examples, the frame defines a sleeve, a box with a removable lid, or a planar member with clamps or other supports to support the electronic device.

In some examples, the frame includes a mounting system configured to secure an electronic device to the frame. For example, the frame may include a VESA mounting system to secure an electronic device to the frame with threaded fasteners.

As shown in FIGS. 1-4, clamshell housing 152 includes a lid 154 and a support system 157. Additionally or alternatively, the clamshell housing may include a locking mechanism to lock the lid in a closed position to restrict access to the electronic device supported by the frame.

Lid 154 supports electronic device 102 proximate a bezel 104 of electronic device 102. As can be seen in FIG. 3, lid 154 defines a window 156 to make visible electronic device 102 supported inside clamshell housing 152, As can be seen in FIG. 4, lid 154 pivots open and closed to allow a user to mount or remove electronic device 102.

Figure 4:
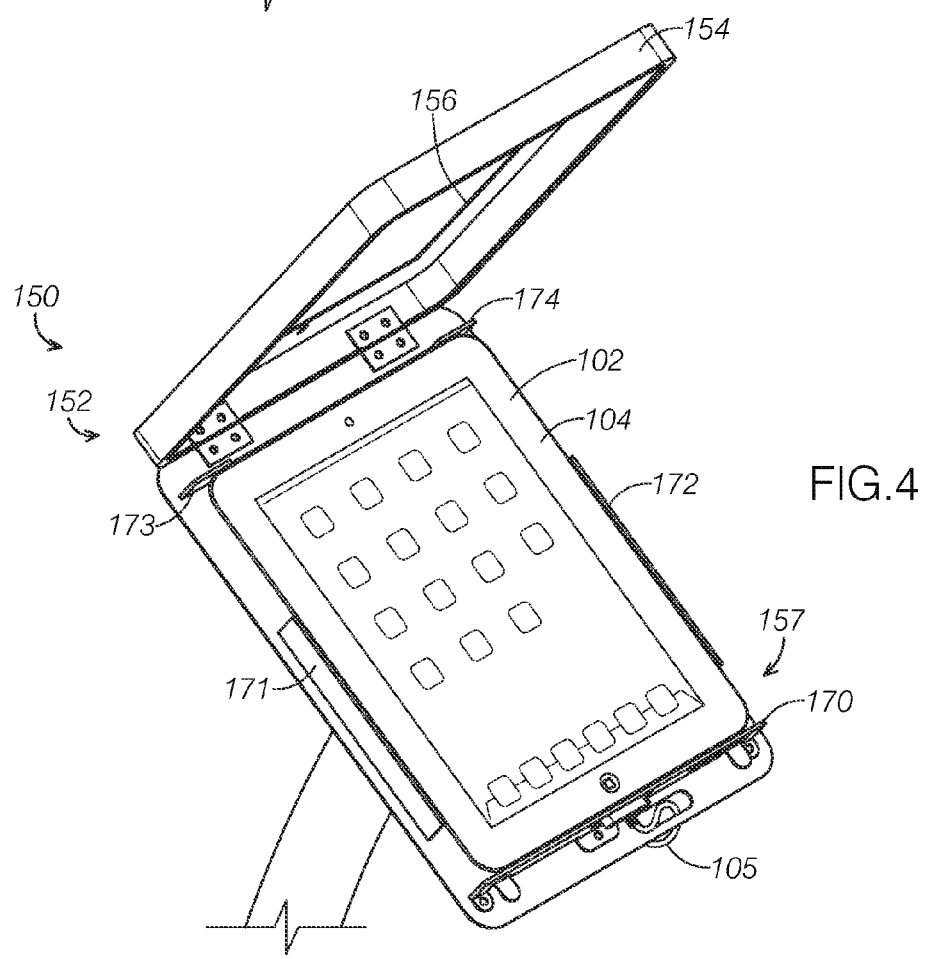
FIG. 4 is a close-up perspective view of the frame shown in FIG. 1 with the frame in an open configuration.

Support system 157 is complimentarily configured with electronic device 157 to support electronic device 102, As shown in FIG. 4, support system includes a set of lateral supports. The set of lateral supports include a first lateral support 170, a second lateral support 171, a third lateral support 172, a fourth lateral support 173, and a fifth top support 174.

The lateral supports are spaced from each other a distance selected to closely conform with the outer dimensions of a given electronic device. The lateral supports support the electronic device from its lateral sides, which secures the electronic device as frame 150 rotates to different orientations. In some examples, the lateral supports are adjustable to a variety of electronic devices with different outer dimensions.

The disclosure above encompasses multiple distinct inventions with independent utility, While each of these inventions has been disclosed in a particular form the specific embodiments disclosed and illustrated above are not to be considered in a limiting sense as numerous variations are possible. The subject matter of the inventions includes all novel and nonobvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of ne claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A kiosk for supporting an electronic device, comprising:
a base;
a stem extending from the base;
a swivel mechanism rotatably coupled to the stem, the swivel mechanism including:
 a fixed member coupled to the stem; and
 a swivel member rotatably supported by the fixed member; and
a frame mounted to the swivel member and configured to support the electronic device, the frame defining a clamshell housing configured to selectively open to receive the electronic device inside the clamshell housing;
wherein the swivel member is configured to rotate relative to the fixed member between a first position, which orients the frame in a first orientation, and a second position, which orients the frame in a second orientation
wherein the clamshell housing includes a lid supporting he electronic device proximate a bezel of the electronic device, the lid defining a window to make visible the electronic device supported inside the clamshell housing.

2. The kiosk of claim 1, wherein the swivel mechanism includes a position selection mechanism to selectively position the swivel member at defined positions relative to the fixed member.

3. The kiosk of claim 2, wherein the position selection mechanism includes:
a ring mounted to the fixed member, the ring including a circumferential surface defining an indentation; and
a protrusion mounted to the swivel member in a position proximate the circumferential surface of the ring and configured to extend into the indentation to restrict the swivel member from rotating relative to the fixed member when the swivel member is in a rest position relative to the fixed member where the protrusion is aligned with the indentation.

4. The kiosk of claim 3, wherein the position selection mechanism further includes a bias mechanism configured to bias the protrusion toward the circumferential surface of the ring and into the indentation when the swivel member is in the rest position relative to the fixed member where the protrusion is aligned with the indentation.

5. The kiosk of claim 4, wherein the bias mechanism includes a leaf spring.

6. The kiosk of claim 3, wherein:
the indentation defines a first indentation and the swivel member is in a first rest position relative to the fixed member when the protrusion extends into the first indentation; and
the circumferential surface of the ring defines a second indentation radially offset from the first indentation and the swivel member is in a second rest position relative to the fixed member when the protrusion extends into the second indentation.

7. The kiosk of claim 6, wherein the circumferential surface of the ring defines a third indentation radially offset from the first indentation and the second indentation and the swivel member is in a third rest position relative to the fixed member when the protrusion extends into the third indentation.

8. The kiosk of claim 1, wherein:
the swivel member defines a channel extending in a circular path less than 360 degrees;
the fixed member includes a knob complimentarily configured with the channel to insert into the channel; and
the channel and the knob cooperate to restrict the swivel member from rotating 360 degrees or more relative to the fixed member.

9. The kiosk of claim 1, wherein the stem is a hollow tube to enable one or more of data cables and power cables to be routed inside the stem to electrically couple with an electronic device supported in the frame.

10. The kiosk of claim 1, wherein the electronic device includes a tablet computer, a laptop computer, or a computer monitor.

11. The kiosk of claim 1, wherein the electronic device is supported by the frame in a portrait orientation when the frame is in the first orientation and the electronic device is supported by the frame in a landscape orientation when the frame is in the second orientation.

12. The kiosk of claim 1, wherein the frame includes a support system complimentarily configured with the electronic device to support the electronic device.

13. The kiosk of claim 1 wherein the swivel mechanism includes a threaded fastener mounted to the swivel member and threadingly engaging a threaded recess defined in the frame.

14. A kiosk for supporting an electronic device, comprising:
a stand;
a swivel mechanism rotatably coupled to the stand, the swivel mechanism including:
 a fixed member coupled to the stand; and
 a swivel member rotatably supported by the fixed member and configured to move relative to the fixed member between a first position and a second position radially offset from the first position; and
 a position selection mechanism cooperatively defined by the fixed member and the swivel member to selectively position the swivel member at defined positions relative to the fixed member, the position selection mechanism including:
  a ring mounted to the fixed member, the ring including a circumferential surface defining a first indentation and a second indentation; and
  a protrusion mounted to the swivel member in a position proximate the circumferential surface of the ring and configured to extend into the first indentation when the protrusion is aligned with the first indentation and configured to extend into the second indentation when the protrusion is aligned with the first indentation; wherein the swivel member is restricted from rotating relative to the fixed member when the protrusion extends into either the first indentation or the second indentation; and a frame mounted to the swivel member and configured to support the electronic device.

15. The kiosk of claim 14, wherein the position selection mechanism further includes a leaf spring configured to bias the protrusion toward the circumferential surface of the ring and into the first indentation or into the second indentation when the swivel member is in a position relative to the fixed member where the protrusion is aligned with the first indentation or the second indentation, respectively.

16. The kiosk of claim 14, wherein the fixed member defines a substantially planar plate and the ring extends from a face of the substantially planar plate.

17. The kiosk of claim 14, wherein the swivel member is complimentarily configured with the fixed member to slidingly about a face of the substantially planar plate of the fixed member and to slidingly abut the ring extending from the face.

18. A kiosk for supporting an electronic device, comprising:
- a base;
- a stem extending from the base;
- a swivel mechanism rotatably coupled to the stem, the swivel mechanism including:
  - a fixed member coupled to the stem; and
  - a swivel member rotatably supported by the fixed member;
- a position selection mechanism to selectively position the swivel member at defined positions relative to the fixed member, the position selection mechanism including:
  - a ring mounted to the fixed member, the ring including a circumferential surface defining and indentation; and
  - a protrusion mounted to the swivel member in a position proximate the circumferential surface of the ring and configured to extend into the indentation to restrict the swivel member from rotating relative to the fixed member when the swivel member is in a rest position relative to the fixed member where the protrusion is aligned with the indentation; and
- a frame mounted to the swivel member and configure to support the electronic device;

wherein the swivel member is configured to rotate relative to the fixed member between a first position, which orients the frame in a first orientation, and a second position, which orients the frame in a second orientation.

19. The kiosk of claim 18, wherein the position selection mechanism further includes a bias mechanism configured to bias the protrusion toward the circumferential surface of the ring and into the indentation when the swivel member is in the rest position relative to the fixed member where the protrusion is aligned with the indentation.

20. The kiosk of claim 18, wherein:
- the indentation defines a first indentation and the swivel member is in a first rest position relative to the fixed member when the protrusion extends into the first indentation; and
- the circumferential surface of the ring defines a second indentation radially offset from the first indentation and the swivel member is in a second rest position relative to the fixed member when the protrusion extends into the second indentation.

\* \* \* \* \*